United States Patent [19]
Fletcher et al.

[11] 3,869,160

[45] Mar. 4, 1975

[54] LATCHING DEVICE

[76] Inventors: James C. Fletcher, Administrator of the National Aeronautics and Space Administration with respect to an invention of; George W. Ulrich, 2815 Devonshire Dr., Florissant, Mo. 63033

[22] Filed: May 2, 1973

[21] Appl. No.: 356,555

[52] U.S. Cl............ 292/108, 292/122, 292/DIG. 14
[51] Int. Cl. ............................................ E05c 19/10
[58] Field of Search ............ 292/99, 108, 122, 121, 292/DIG. 14, DIG. 39, DIG. 40, DIG. 41; 70/240, 466

[56] References Cited
UNITED STATES PATENTS

| | | | |
|---|---|---|---|
| 37,625 | 2/1863 | Hyde | 292/108 X |
| 398,371 | 2/1889 | Bartlett | 292/108 X |
| 1,646,343 | 10/1927 | Beltz | 292/99 |
| 3,207,543 | 9/1965 | Boyer | 292/52 |
| 3,463,530 | 8/1969 | Modes | 292/108 X |

Primary Examiner—Robert L. Wolfe
Attorney, Agent, or Firm—Wayland H. Riggins; L. D. Wofford, Jr.; John R. Manning

[57] ABSTRACT

A latching device particularly suited for use in establishing a substantially motionless connection between a stationary receiver and a movable latching mechanism. The latching mechanism includes a pivotally supported restraining hook continuously urged into a capturing relationship with the receiver, characterized by a spring-biased pawl having a plurality of aligned teeth projected from one surface thereof seated in the surface of the throat of the hook and positionable into restraining engagement with a rigid restraining shoulder projected from the receiver, and a ball-and-detent coupling including a protuberance having a spherical distal surface extended from the latching mechanism and a conical seat provided in the receiver for accepting the protuberance.

9 Claims, 5 Drawing Figures

PATENTED MAR 4 1975  3,869,160

LATCHING DEVICE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to latching devices, generally, and to an improved latching device for joining structural components in a motionless connection, particularly.

The prior art is, of course, replete with latching devices including spring-biased pawls, hooks and the like adapted to capture and be captured. Such devices are typified by the device disclosed in the patent to Tantlinger, et al., U.S. Pat. No. 3,092,282, granted June 4, 1963.

As, of course, is well understood by those familiar with the design of latching devices, it often is highly desirable to provide a mechanism for establishing motionless connections between structural components disposed in juxtaposition. As can be appreciated, it often is imperative that the components of a latching device be capable of achieving a latched relationship, even in instances wherein structural components to be joined are subject to misaligning motion as the components are moved into juxtaposition. Consequently, substantial effort has gone into the design of latching devices which are capable of fulfilling existing needs. Unfortunately, however, the resulting devices often are characterized by complexity, unreliability, and fabrication costs which tend to reduce the practicality, utility and desirability thereof.

It is, therefore, a general purpose of the instant invention to provide a simplified, reliable and economic latching device characterized by a capability of joining with ease misaligned structural components in a motionless relationship, and one which has particular utility in securing hinged closure members typified by hatch covers, automobile hoods and the like.

OBJECTS AND SUMMARY OF THE INVENTION

It is therefore an object of the instant invention to provide an improved latching device which overcomes the aforementioned inadequacies which characterize available devices.

It is another object to provide an improved latching device for joining structural components in a motionless relationship.

It is another object to provide an improved latching device capable of joining misaligned structural components.

It is another object to provide an improved latching device capable of joining misaligned structural components in a manner such that relative motion therebetween is precluded.

It is another object to provide an economic and reliable latching device particularly suited for securing hinged closure members typified by hatch covers, automobile hoods and the like.

These and other objects and advantages are achieved through the use of a substantially rigid, stationary receiver, a movable latching mechanism for capturing the receiver, when the receiver and the latching mechanism are in juxtaposition, including a bracket, a spring-biased restraining hook supported for pivotal movement into capturing relation with the receiver, including a spring-biased pawl having a plurality of teeth for engaging a rigid stop shoulder provided at a selected surface of the receiver, and a ball-and-detent coupling, of a cone-and-sphere configuration, for securing the latching mechanism and receiver in a motionless relationship, as will become more readily apparent by reference to the following description and claims in light of the accompanying drawings.

DESCRIPTION OF THE PREFERRED EMBODIMENT

Figure 1:
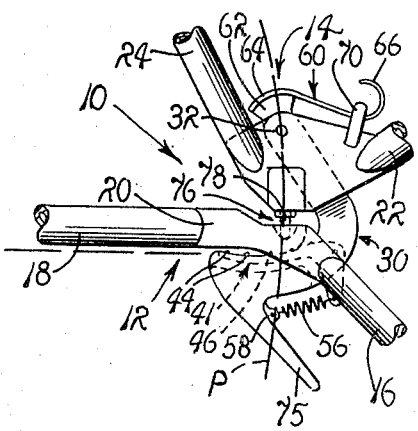
FIG. 1 is a fragmented, side elevation of a device, depicting a captured relationship established between the juxtaposed receiver and latching mechanism thereof, when the device is in a latched configuration, which embodies the principles of the instant invention.
Figure 2:
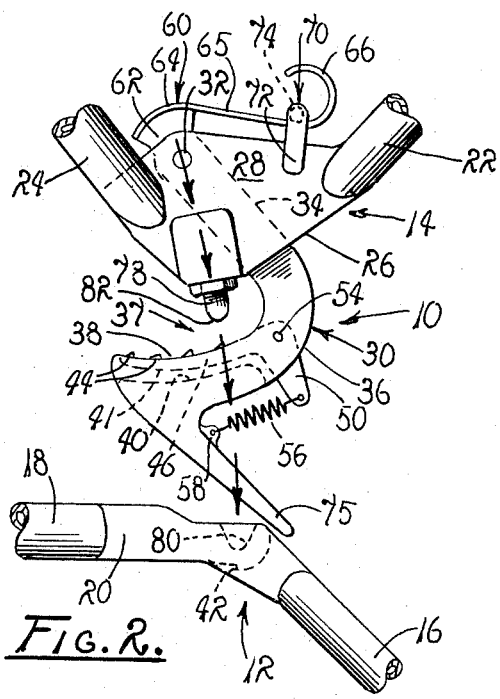
FIGS. 2, 3, and 4 are side elevational views collectively depicting sequential relative positions assumed by the latching mechanism and receiver as relative motion is imparted thereto for positioning the receiver and the latching mechanism in juxtaposition.
Figure 3:
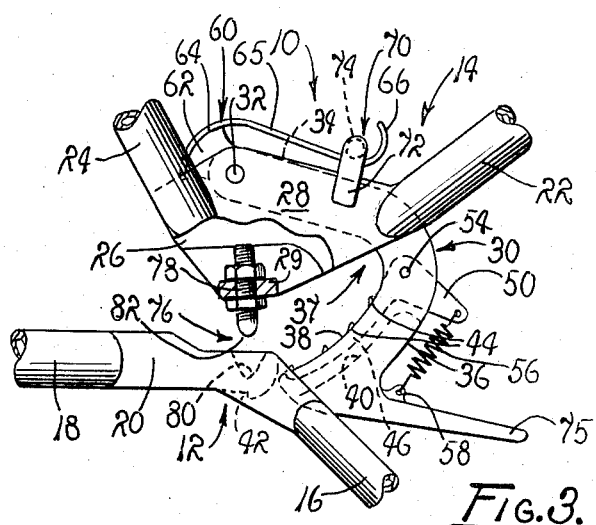
Figure 4:
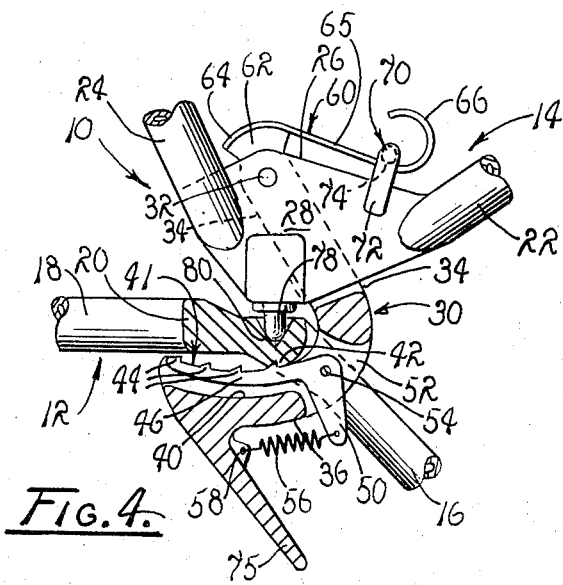
Figure 5:
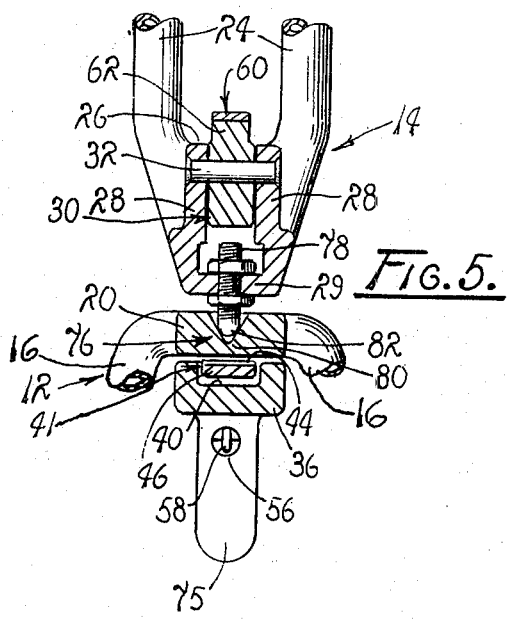
FIG. 5 is a sectioned elevation of the mechanism and receiver, rotated through 90° with respect to the view shown in FIG. 4.

Referring now to the drawings wherein like reference characters designate like or corresponding parts throughout the several views, there is shown in FIG. 1 an improved latching device 10, in latched configuration, which embodies the principles of the instant invention.

The device 10 includes a receiver 12 and a latching mechanism 14, which, in operation, are moved into juxtaposition preparatory to establishing a captured relationship therebetween. As a practical matter, where the device 10 has utility as a latching device for securing pivoted closure members such as automobile hoods and the like, the receiver 12 is deemed to be rigidly supported by a suitable frame, such as that provided for automobiles and the like, while the mechanism 14 is mounted on the hood thereof in a position to be received by the receiver 12 as the hood is closed.

Of course, it is to be understood, quite clearly, that the device 10 can be employed in uniting structural members of various types and that its utility is not limited to automobile hoods, or even hinged closure members. Moreover, it is to be understood that either the receiver or latching mechanism or both of these, can be mounted for mutual movement along selected paths.

However, for purposes of description, it is assumed that the receiver 12 is supported as a stationary component while the latching mechanism 14 is supported for movement, along an arcuate path designated P scribed about a hinge point HP, to be intercepted by the receiver.

The receiver 12 conforms to a three-leg configuration and includes a pair of converging, coplanar legs 16 and an angularly related pair of coplanar legs 18, only one of which is shown. The legs 16 and 18 converge at a receiver bar 20 and serve as supports therefor. As a practical matter, the legs 16 and 18 and the bar 20 are welded into an integral unit with the legs 16 being projected generally downwardly from the opposite ends of the bar 20, while the legs 18 are projected substantially horizontally therefrom. In practice, the legs 18 are angularly related with respect to each other and to the bar 20 for avoiding engagement with the latching mechanism 14 as the latching mechanism 14 is moved into a capturing relationship with the receiver 12 for establishing a latched configuration for the device 10. The particular angularity of the legs 18, relative to the receiver bar 20, is a matter of convenience and can be varied as desired.

The latching mechanism 14 also is supported by a pair of coplanar legs 22 and an angularly related pair of legs 24, only one of which is shown. The legs 22 and 24 are quite similar in design and function to the legs 16 and 18. The legs 24 preferably are angularly related with respect to the plane of the legs 22, and also are so positioned as to avoid interfering with the latching function of the device 10 as the latching member 14 is moved into capturing relation with the receiver 12.

The legs 22 and 24 are united by welding or the like with a bracket 26. This bracket functions as a gusset for the legs and serves as a mount for the latching mechanism 14. The bracket 26, in turn, includes a pair of plates 28 and a base plate 29 extended therebetween.

A hook 30 of an arcuate configuration is pinned at its base, by a suitable bearing pin 32, to the plates 28, and is supported thereby for oscillation therebetween. As a practical matter, the hook 30, the bearing pin 32, and the plates 28 are so related as to accommodate oscillatory motion of the hook between a "cocked" position and an "actuated" position. This motion occurs about the bearing pin 32, while substantially all random motion is eliminated. While not shown, it also is to be understood that the desired relationship is achieved through a use of suitable bushings, shims and the like.

The hook 30 includes a shank 34 extending from the bearing pin 32 and terminating in a base 36. The longitudinal axis of symmetry of the base is angularly related with the longitudinal axis of symmetry of the shank 34 so that the base and the shank collectively define therebetween a throat 37. The base 36 includes an arcuate surface 38, facing the throat 37, having formed therein an elongated slot 40 extended throughout its length for receiving a ratchet pawl 41. As a practical matter, the arcuate surface 38 has a radius extended from a point near the bearing pin 32 and is of a length such that once the latching mechanism 14 is in a capturing relationship with the receiver 12 the surface 38 forcibly engages the receiver bar 20. Thus, the receiver 12 and the latching mechanism 14 of the device 10 mutually support each other against relative movement along a path coinciding with the radius of the surface 38.

The receiver bar 20 is provided with a depending shoulder 42, at its lowermost surface, positioned to be engaged by the pawl 41 as the arcuate surface 38 of the hook 30 is caused to capture the receiver 12. The shoulder 42 serves as a stop for engaging one of a plurality of teeth 44 projected from the upper surface of a tongue 46 of the pawl 41. The pawl 41 is of a bellcrank configuration and includes an actuating arm 50 angularly related to the tongue 46. As shown in the drawings, the tongue 46 is seated in the slot 40 of the base 36, while the actuating arm 50 extends through an opening 52 suitably provided in the base of the hook 30. A bearing pin 54 is employed in a suitable manner for pivotally coupling the ratchet pawl 41 with the base 36 of the hook 30, whereby the pawl 41 is supported to function as a locking ramp, as hereafter explained.

The tongue 46, as shown, is of an arcuate configuration having a radius consistent with the radius of the surface 38. However, the tongue continuously is urged outwardly from the slot 40 in response to a biasing force applied thereto by a tension spring 56 coupled at one end thereof to the actuating arm 50, at its distal end. The opposite end of the spring 56, anchored at a suitable eye 58, is provided in the base 36, in spaced relation with the arm 50. Therefore, it is to be understood that a continuous force is applied to the ratchet pawl 41 for biasing the pawl in pivotal rotation about the bearing pin 54. Thus, the tongue 46 is continuously urged outwardly from the slot 40 toward the throat 37. However, it also is to be understood that the opening 52 is appropriately configured so that the surfaces thereof serve as motion-limiting stops for restraining the tongue 46 against excessive movement relative to the slot 40. Thus, it is assured that the tongue 46 affords no obstruction for the hook 30 as it is pivoted into a capturing relationship with the receiver bar 20 of the receiver 12.

In order to achieve a capturing of the receiver bar 20, by the hook 30, a preloaded spring 60 is affixed to a cantilevered extension 62 of the hook 30. The extension 62 projects from the head end of the shank 34 and terminates in spaced relation with the bearing pin 32. The spring 60 is a modified leaf spring, having a base segment 64, an intermediate segment 65, and a distal segment 66. The segments 64 and 66 are oppositely curved so that the spring 60, in effect, is of an S-shaped configuration.

The base segment 64 is welded or otherwise secured to the distal end of the extension 62, of the shank 34, while the distal segment 66 of the spring is passed through a retainer 70. The retainer 70 includes a pair of upstanding bracket arms 72, projected from the bracket 26, and a roller 74 pinned for rotation therebetween. It is to be understood that the spring 60 is strained as it is passed beneath the roller 74 in a direction extending toward its base segment 64. The recovery or reaction forces of the strained spring 60 are, in turn, concurrently applied to the extension 62 of the hook 30 and the retainer 70 in a manner such that the hook 30 continuously is biased to move toward a capturing relation with the receiver bar 20.

Movement of the hook 30 to its cocked position is against the bias of the spring 60 and requires that the spring 60 be strained within its elastic limits so that the thus stored energy or recovery forces of the spring serve to bias the hook 30 toward its latched disposition.

In order to impart such movement of the hook 30, as the latching mechanism 14 is advanced into juxtaposition with the receiver 12, there is provided an inclined cocking arm 75 projected from the distal end of the base 36 of the hook 30 and functions as a cocking ramp. In practice, the arm 75 is configured so that as the latching mechanism 14 approaches the receiver 12, the distal end of the arm 75 engages the adjacent surface of the receiver bar 20 and is displaced thereby as a sliding engagement is established therebetween. The resulting forces drive the hook in rotation toward its cocked position, whereupon the spring 60 is strained. Of course, once the latching mechanism 14 is in juxtaposition with the receiver 12, and the throat 37 is aligned with the receiver bar 20, the cocking arm 75 is disengaged from the bar 20 and thus releases the hook 30 for movement towards its latched position.

In order to assure that a motionless connection is established between the receiver 12 and the latching mechanism 14, there is provided a sphere-and-cone coupling generally designated 76. This coupling includes a stud 78, adjustably mounted on the base plate 29 of the bracket 26, and a detent 80. It is important to note that the stud 78 terminates in a surface 82 of a generally spherical configuration while the detent 80 is of an inverted conical configuration. Therefore, it should readily be apparent that the adjacent surfaces of the stud 78 and the detent 80 preclude a seating of the stud at the bottom of the detent. Thus, a motionless engagement is established between the spherical surface 82 of the stud 78 and the adjacent conical surface of the detent 80. Consequently, all motion of the latching mechanism 14 in lateral directions, relative to the receiver 12, is precluded.

OPERATION

It is believed that in view of the foregoing description, the operation of the device will be readily understood and it will be briefly reviewed at this point.

With this device 10 assembled in the manner hereinbefore described, it is assumed that the receiver 12 is supported against motion by the legs 16 and 18 while the latching mechanism 14 is supported for movement along an arcuate path, designated P, scribed about the hinge point HP.

As the latching mechanism 14 approaches the receiver 12, the cocking arm 75 engages the receiver bar 20. Continued motion of the latching mechanism 14 causes the surface of the arm 75 to slide along the adjacent surface of the receiver bar 20, in a manner consistent with that of a ramp, for thereby forcing the hook 30 to move in rotation about the bearing pin 32 to its fully retracted or cocked position. Such motion is against the applied bias of the spring 60 and continues until such time as the throat 37 is positioned in opposition with the receiver bar 20 whereupon the arm 75 disengages the bar 20.

At the instant the opening 37 is positioned in opposition with the receiver bar 20, the recovery forces of the spring 60 act to drive the hook 30 from its cocked position to its latched position wherein the receiver bar 20 is captured by the hook. As the hook is driven to its latched position for capturing the receiver bar 20, the teeth 44 of the pawl 41 engage and pass over the shoulder 42. Thus, the pawl oscillates about the bearing pin 54 as the spring 56 urges the tongue 46 from the slot 40. Of course, the last-in-line tooth engages the shoulder 42 and establishes an abutting relationship therewith, as the hook 30 is seated in its latched position, for thus inhibiting a retraction of the hook from its latched position.

It is here noted that once the hook 30 is seated in its latched position, the bearing pin 32 is in a coplanar relationship with the shoulder 42. Accordingly, this relative positioning of the pin 32 and shoulder precludes an introduction of a moment arm acting about the bearing pin as separating forces are applied to the device 10 along the radius of the arcuate surface 38.

It also is to be particularly noted that the coplanar relationship of the shoulder 42 and the bearing pin 32 is maintained by the sphere-and-cone coupling 76, as a consequence of a contiguous relationship of the stud 78 relative to the surface of the detent 80. Furthermore, it is noted that the adjacent, inclined surfaces of the legs 16 engage the adjacent surfaces of the base 36, as the hook 30 approaches its latched position, for thus guiding the latching mechanism in a direction such that the opening of the detent 80 receives the distal end of the stud 78. Of course, once the stud is received within the opening of the detent 80, the conical surface of the detent acting against the spherical surface 82 of the stud 78 serves to finally position the stud relative the detent. Thus, the receiver bar 20 is captured by the hook 30 so that the device 10 is caused to assume a latched configuration.

Release from the latched configuration can be effected by manually rotating the pawl 41, about the bearing pin 54, and thereafter retracting the hook 30 from its captured relationship with the bar 20.

In view of the foregoing, it should readily be apparent that the device of the instant invention provides a practical solution to an age-old problem of providing an efficient, reliable and economic latching device having particular utility in coupling structural component in a substantially motionless relationship.

Although the invention has been herein shown and described in what is conceived to be the most practical and preferred embodiment, it is recognized that departures may be made therefrom within the scope of the invention, which is not to be limited to the illustrative details disclosed.

I claim:

1. An improved latching device comprising:
   means including a substantially rigid receiver;
   latching means for capturing the receiver when the receiver and latching means are in juxtaposition including a bracket, a restraining hook supported by said bracket for pivotal movement into restraining engagement with said receiver, and biasing means for continuously urging the hook into restraining engagement with said receiver;
   support means supporting said latching means and said receiver for relative movement into juxtaposition;
   said latching means including a protuberance mounted on said bracket having a distal surface of a spherical configuration and means defining within said receiver a conical seat for receiving said protuberance.

2. An improved latching device comprising:
   means including a substantially rigid receiver;
   latching means for capturing the receiver when the receiver and latching means are in juxtaposition including a bracket, a restraining hook supported by said bracket for pivotal movement into restraining engagement with said receiver, and biasing means for continuously urging the hook into restraining engagement with said receiver;
   support means supporting said latching means and said receiver for relative movement into juxtaposition;
   said hook including means defining thereon a locking ramp having an elongated arcuate surface for slidably engaging a selected surface of said receiver;
   a latching tongue carried by said hook and extending substantially coextensive with said arcuate surface and having along the surface thereof an ordered array of projected teeth, and means supporting said tongue for pivotal movement relative to the selected surface of said receiver, whereby said teeth are caused to engage said selected surface.

3. The latching device of claim 1 wherein said hook further includes means defining a projected cocking ramp slidably engageable with said receiver for pivotally retracting the hook against the biasing means, as the latching means and the receiver are moved into juxtaposition.

4. The latching device of claim 3 wherein said hook further includes means defining thereon a locking ramp having an elongated arcuate surface for slidably engaging a selected surface of said receiver.

5. The latching device of claim 4 further including means defining within said arcuate surface a slotted opening extending longitudinally thereof, a latching tongue seated within said opening and having along the surface thereof an ordered array of projected teeth, and means supporting said tongue for pivotal movement relative to the selected surface of said receiver, whereby said teeth are caused to engage said selected surface.

6. The latching device of claim 5 further comprising biasing means continuously urging said tongue outwardly from said slotted opening.

7. The latching device of claim 2 further including means defining on the selected surface of said receiver a shoulder for receiving said teeth in an abutted relationship.

8. The latching device of claim 2 wherein said latching means further includes a projected stud fixed to said bracket having a distal surface of a spherical configuration, and means defining within said receiver a conical seat for receiving said stud when said latching means and said receiver are in juxtaposition.

9. The device of claim 1 wherein said receiver further includes guide means engageable with the restraining hook for positioning the hook to a preselected disposition as the hook is pivotally moved into restraining engagement with said receiver, whereby misalignment between the receiver and the latching means is tolerated.

* * * * *